United States Patent [19]
Drum

[11] Patent Number: 5,403,066
[45] Date of Patent: Apr. 4, 1995

[54] VEHICLE SEAT COVER

[76] Inventor: Thomas T. Drum, 2700 NE. 8th St., Pompano Beach, Fla. 33062

[21] Appl. No.: 263,941

[22] Filed: Jun. 22, 1994

Related U.S. Application Data

[63] Continuation of Ser. No. 931,592, Aug. 18, 1992, abandoned.

[51] Int. Cl.$^6$ .............................................. A47C 3/00
[52] U.S. Cl. ........................... 297/219.1; 297/DIG. 1; 297/452.16
[58] Field of Search ............... 297/219, 452, 456, 229, 297/218, DIG. 1, 219.11, 219.1, 219.12, 452.16, 452.1, 452.11

[56] References Cited

U.S. PATENT DOCUMENTS

| | | | |
|---|---|---|---|
| 2,728,835 | 3/1956 | Eames | 297/218 |
| 2,811,199 | 10/1957 | Morrill | 297/229 |
| 2,822,862 | 2/1958 | Zacks | 297/229 |
| 3,278,226 | 10/1966 | Magnusson | 297/219 |
| 4,383,712 | 5/1983 | Kaganas | 297/219 |
| 4,396,227 | 8/1983 | Neilson | 297/219 |
| 4,457,032 | 7/1984 | Clarke | 297/456 |
| 4,699,427 | 10/1987 | Kobayashi | 297/218 |
| 4,773,702 | 9/1988 | Takahashi | 297/DIG. 1 |

FOREIGN PATENT DOCUMENTS 939967  10/1963  United Kingdom ................ 297/229

*Primary Examiner*—P. Austin Bradley
*Assistant Examiner*—James Miner
*Attorney, Agent, or Firm*—Malin, Haley, DiMaggio & Crosby

[57] ABSTRACT

An improved seat cover for use with automobile, truck or other type vehicle seats for improved comfort, heat reduction and to avoid user perspiration, said seat cover including reversible terrycloth fabric sheets that include a foam padding disposed therebetween, said foam padding being separated by individual longitudinal chambers, and said seat cover including a plurality of mounting straps firmly connecting the seat cover to the vehicle seat by flexible, stretchable bungee cords. The seat cover includes a plurality of lateral and longitudinal rods that ensure form and configuration stability. A very thin foam cell sheet is used between the outer portions of the seat cover and vehicle seat to prevent lateral movement of the seat cover.

14 Claims, 2 Drawing Sheets

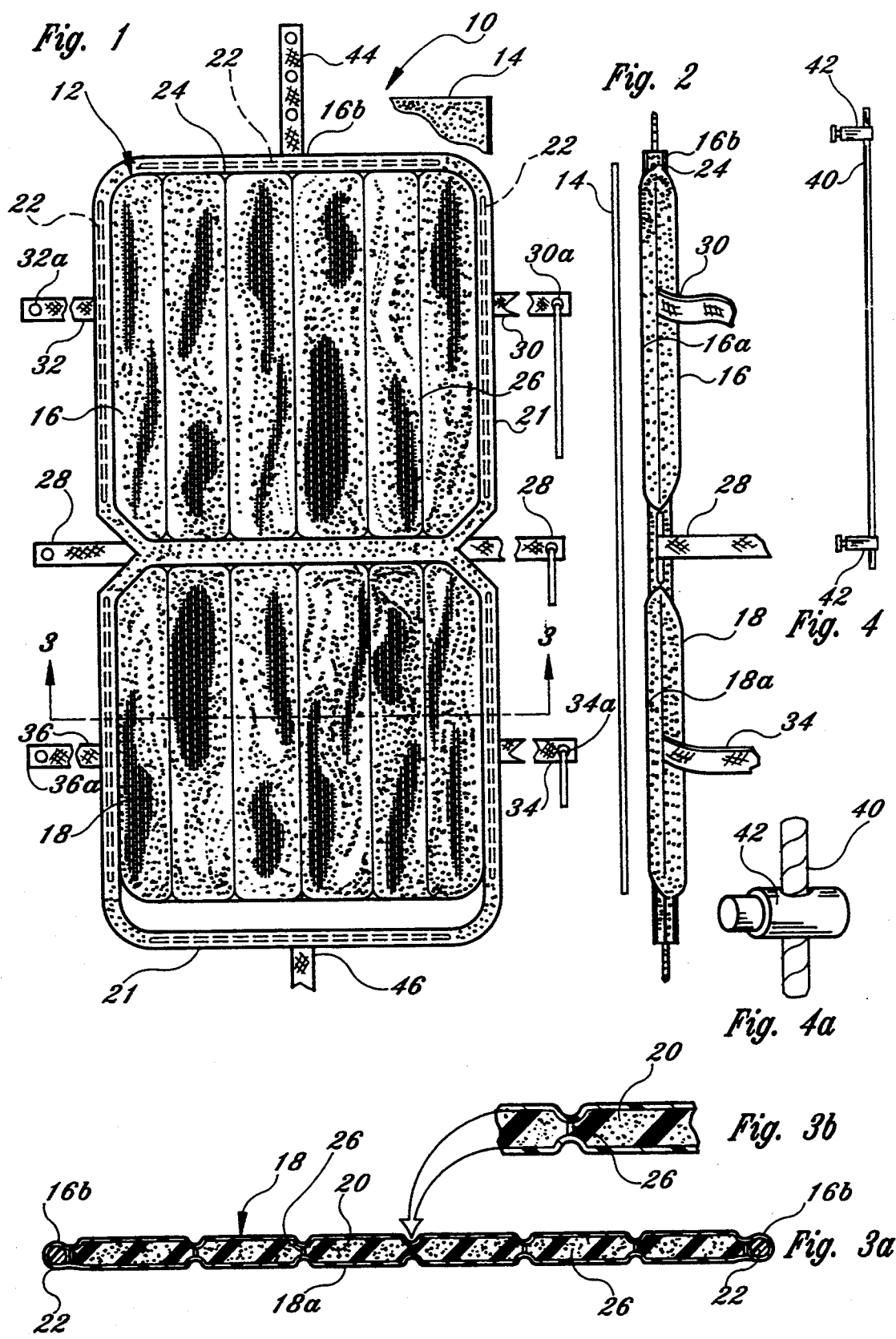

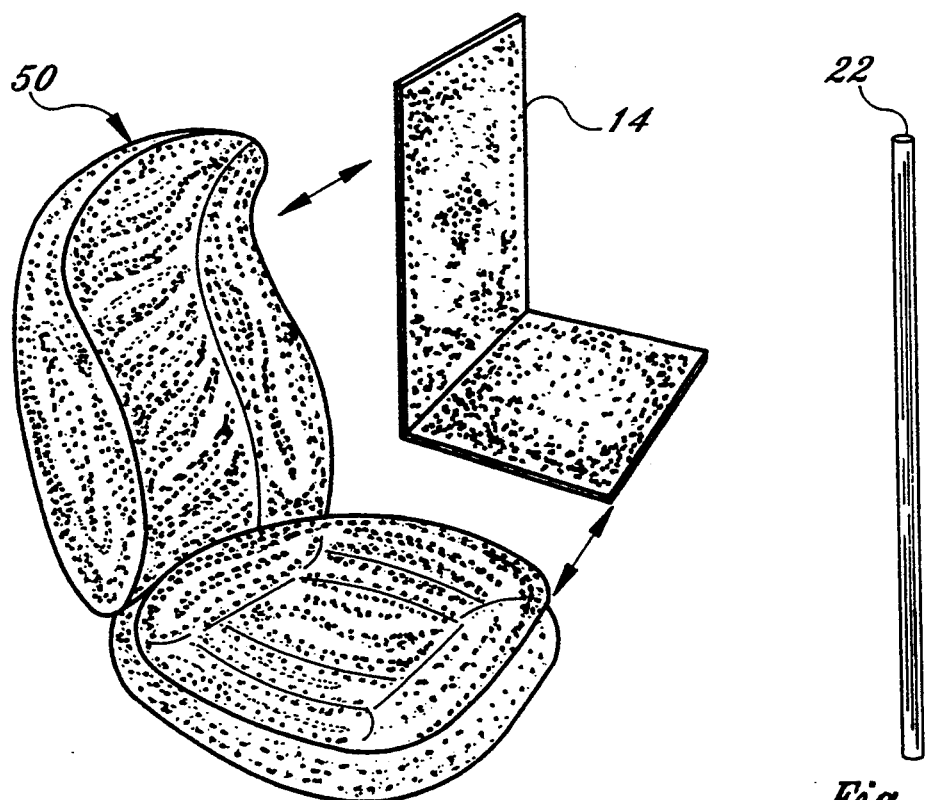
Fig. 6
Fig. 7
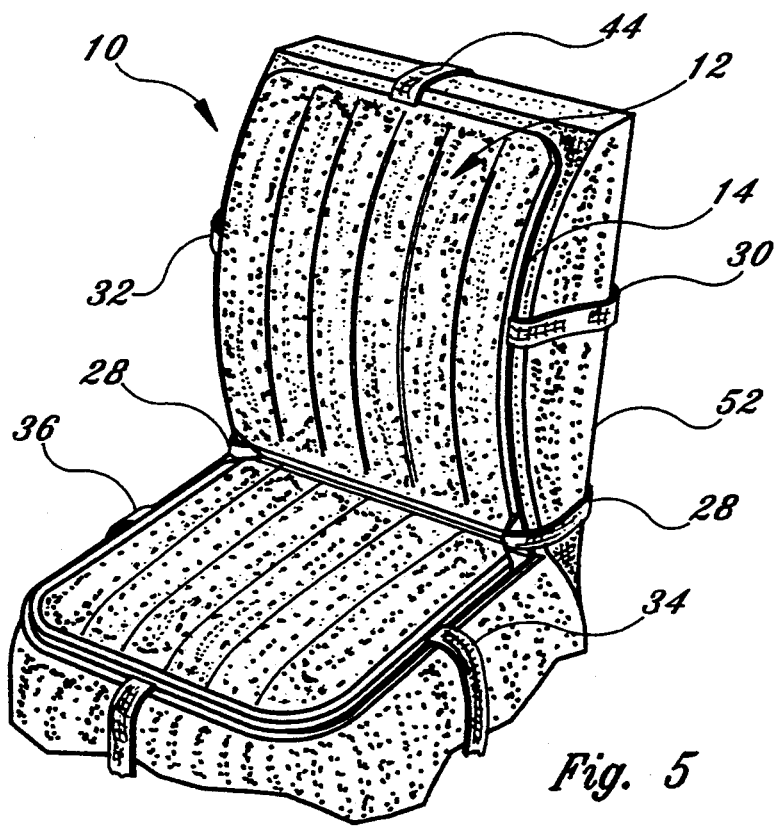
Fig. 5

VEHICLE SEAT COVER

This application is a continuation of application Ser. No. 07/931,592, filed Aug. 18, 1992, now abandoned.

BACKGROUND OF THE INVENTION

1. Field of the Invention

This invention relates generally to a seat cover, having a universal design whereby it fits most seats found in land vehicles, such as automobiles and trucks, and more particularly, to a universal improved seat cover, fitable for most automobile and truck seats that provides improved user comfort, greater seat protection, reduced thermal absorption in the seat, uplift and increased breathing efficiency, and that is reversible, washable, and laterally stable.

2. Description of the Prior Art

Numerous types of seat covers are known in the prior art, such as sheepskin, covers having a plurality of spherical beads, and cloth covers, all of which have been used for numerous reasons. Seat covers are normally used for protection of the seat, reduction of sweating which typically occurs with leather seats, insulation from certain seat materials, such as vinyl or leather, that have high heat absorption making them uncomfortable to sit on when entering a vehicle, and overall comfort for the user. Additionally, most states now require passengers to wear seat belts, therefore, adaptability is another consideration when selecting a seat cover.

While there are universal styled seat covers on the market already, they have their shortcomings. For instance, some of the drawbacks found with seat covers to date are their lack of stability and their proneness to sliding about the seat, making them uncomfortable and even dangerous. Furthermore, some vehicles still require custom made seat covers even though universal designs are supposedly available. Other drawbacks include the fact that seat coverings such as sheepskin are themselves uncomfortable in hot weather, are easily soiled, and difficult to clean. In short, the typical universal type seat cover does not fit properly, is uncomfortable, and fails to accomplish its intended purpose.

The present invention overcomes the aforementioned problems of the prior art by providing an improved seat cover that ensures better vehicle seat protection and comfort by providing a lower heat absorbing material for temperature reduction, rigid, yet comfortable rods for increased stability and shape retention, and decreased or eliminated user perspiration that occurs when sitting against the typical vinyl or leather seat. In addition, the present invention provides a seat cover that is reversible, washable, and includes foam cell sheets to prevent sliding. The seat cover also fits tightly on a variety of seat sizes, including bucket seats and regular seats, and is structurally adaptable to various seat belt designs.

SUMMARY OF THE INVENTION

The present invention provides a seat cover for vehicles such as automobiles and trucks that is universally fitable, comprising two sections with the first section comprising a first terrycloth sheet, a second terrycloth sheet, a foam layer mounted in between said first terrycloth sheet and said second terrycloth sheet, wherein said first foam layer and said first and second terrycloth sheets are sized to fit over the top of the conventional vehicle seat.

A second cover section is constructed similar to the first section wherein it comprises third and fourth terrycloth sheets filled with a foam sheet with the terrycloth sheet enclosed around the foam sheet and sewn together around its perimeter.

Therefore, the seat cover is comprised of a first or lower cover section that is, in effect, a bottom pad that sits on top of the vehicle seat having a back pad which comprises the second or upper section, that is uniformly and integrally formed with the bottom pad. The back pad rests against and protects the upper back portion of the seat.

Both cover sections include rigid, yet somewhat bendable rods, one along each side and one on the open end of each section of the cover, disposed longitudinally and mounted in small terrycloth channels along the lateral edges. The Delrin (a trademark of Dupont) plastic rods are used for stability and maintaining the shape of the seat cover so that it retains its form, regardless of the weight placed on it by the user.

Both seat cover sections, that is the bottom and top sections that fit against the seat and upper portions, respectively, of the vehicle seat, include short nylon strap segments that have apertures therein for receiving bungee cords. The bungee cords are elastic, flexible elongated cords attached to the lateral edges of the seat cover that wrap around the seat housing itself to firmly tie the seat cover to the seat. In addition, a central strap runs the entire width of the seat cover and is disposed between the bottom and top seat cover sections, where the two sections join, for anchoring to the seat at the adjoining section of the back and seat portions to firmly hold the cover in place, thus preventing the seat cover from moving. This centrally disposed elongated lateral strap also includes apertures for tying elastic bungee cords from end to end to tautly hold the entire seat cover in place. The inner section and lateral line, defining and separating the top and bottom segments of the seat cover, include angular pie-shaped segments that have been removed to allow for proper fitting of the seat cover against the seat and to allow for seat belt operation.

In addition, longitudinal strap segments may be utilized and tied in with the lateral strap segments through the bungee cords, with the longitudinal segments being mounted and sewn at the mid-base center portion. The longitudinal strap segments go down the front side of the seat of the vehicle and down the back side of the background section, located at the very top upper segment of the seat cover in its midsection, each of the straps being essentially nylon and having apertures again for total engagement with the elastic bungee cords.

Both seat sections, the lower and the upper, also include sewn together seam or channel portions longitudinally disposed so that the foam is trapped inside the terrycloth first and second sheets and third and fourth sheets, to define comfort zone segments, to prevent the foam rubber from laterally shifting, and to act as padding for the human torso upon a seat. Also, they are so arranged as to conform to the newer ergonomically designed hugging bucket seats.

The terrycloth cover itself may be 95% cotton and 5% dacron, making it shrinkproof and fully washable and reversible on both sides, since both sides of the seat cover are identical in construction. The attaching straps are sewn to the edges in the mid-portion so that the entire unit is reversible. The front construction and the back construction of the seat covering are essentially identical. The seat cover could, in an alternate embodiment, be constructed of two elongated terrycloth sheets connected around their perimeter and at the middle section in lieu of four sheets.

Also, in order to enhance lateral stability, a very thin foam cell sheet is mounted between the actual vehicle seat and the seat cover. The elongated sheet is sized to cover a significant portion of the top seat and the bottom seat. The foam cell sheet may be sized to be approximately ⅛" thick and because it contacts the seat cover directly, it provides resistance to the shifting of the outside seat cover.

In order to utilize the present invention, the foam cell sheet is first placed against the seat prior to the installation of the cover itself. Next, the seat cover is placed in position with the lower or bottom section placed flatly and parallel to the bottom seat and the second or upper section placed against the surface of the portion that engages the user's back when seated. The straps of the lower section, which includes the strap apertures for both the bottom lateral sides and the front of the bottom seat, are then moved into position, connected together by the elastic bungee cords and because of the elastic stretchable nature of the bungee cords, tied firmly together so that the lower seat portion does not move. The upper portion is then firmly attached, as is the mid-lateral strap that extends the width of the cover, by the bungee cords. Other types of attachment cords may be utilized if necessary, but one of the virtues of the bungee cords is that while they firmly hold the entire unit in place, they are easy to untie. This allows the seat cover to be easily reversed, doubling the longevity of use between washings.

Once the unit has been installed, the terrycloth absorbs the sun's rays without retaining heat, thus providing an externally hot free surface for sitting. Should fading occur, the reverse side offers you a new cover, so actually, two covers in one. The maximum surface area provided by the cotton fabric distributes the heating effect of the sun so that the seat is comfortable for sitting even though the vehicle has been parked in direct sunlight and radiation. The foam cushions and the lateral stability provided by the foam cell sheet and rods greatly enhance the comfort and uplift of the seat. The terrycloth also acts as an insulation barrier between the seats if they are made of leather to prohibit or prevent sweating of the individual, which is common with most leather seats.

It is an object of this invention to provide an improved vehicle seat cover for reducing temperature, for increased comfort, for increased uplift, and to prevent perspiration by the user normally caused by leather seats.

It is another object of this invention to provide an improved vehicle seat cover for automobiles and trucks for bucket seats and individual seats that has improved lateral stability, while being washable, reversible and universally mounted on virtually any size vehicle seat.

It is another object of this invention to provide an improved padded vehicle seat cover that can be firmly and stably attached to a vehicle seat, and that has improved shape and stability through a flexible rod structure.

It is another object of this invention to provide a comfortable improved seat cover that includes finished edges for comfort and that has additional use for wheelchairs, boat seats and the like.

In accordance with these and other objects which will be apparent hereinafter, the instant invention will now be described with particular reference to the accompanying drawings.

BRIEF DESCRIPTION OF THE DRAWINGS

FIG. 1 shows a front elevational view with the seat cover in a vertical extended position, showing top and bottom segments of the front of the seat cover. A rear elevational view would be essentially identical to the front view of FIG. 1.

FIG. 2 shows a side elevational view of the invention.

FIGS. 3A and 3B show a side elevational cross section of the invention, with FIG. 3B including a segment cutaway of a portion of the view shown in FIG. 3A.

FIGS. 4 and 4A shows a front elevational view of a bungee cord and connectors used in accordance with the present invention.

FIG. 5 shows the present invention in perspective attached to a typical vehicle seat.

FIG. 6 shows a perspective view of a bucket seat that could be used with the foam cell sheet shown exploded above.

FIG. 7 shows a perspective view of a plastic rigid, but somewhat flexible rod 22 that is used in the seat cover for support, rigidity and shape retention.

PREFERRED EMBODIMENT OF THE INVENTION

Referring now to the drawings, and in particular FIG. 1, the present invention is shown generally at 10, comprising a seat cover 12 and partially cutaway foam cell sheet 14, which are used in conjunction with each other to accomplish the invention.

The seat cover 12 includes a terrycloth sheet 16 that is threadably attached by sewing to a second terrycloth sheet 16a, connected on its opposite side (not shown in FIG. 1), and terrycloth sheet 18 integrally connected to terrycloth sheet 16, having an additional terrycloth sheet 18a attached to its opposite side. The four terrycloth sheets are connected together to form upper and lower seat cover sections that enclose plastic foam padding 20 in individual panels sewn together along threaded seams 26 for more rigid lateral support of the foam. A border 16b of just two layers of terrycloth form the perimeter of each upper and lower seat cover section. In addition, looking at FIG. 1, vertically and horizontally disposed at the lateral edges inside the terrycloth border channel, are disposed solid rods 22 made of plastic which can flex while providing for a stabilized and firm contour on each side and end of the seat covers. The rod itself is shown in FIG. 7.

FIG. 1 also shows a plurality of rectangular nylon or other fabric straps 30 and 32, connected to the upper seat cover section, and straps 34 and 36 connected to the lateral edges of the bottom cushion. In addition, at the top middle portion longitudinally placed is another strap 44, and at the bottom midsection yet another strap 46, all of which contain apertures such as 30a, 32a, 34a, 36a, 44a and 46a for receiving a cord such as a bungee cord 40 shown in FIG. 4 that includes conventional removable spring-loaded fasteners 42 shown in FIG. 4a that allows the fastener to be removed from the flexible bungee cord 40 at the ends. This allows the bungee to be disposed through the aperture shown in straps 30, 32, 34, 36, 44 and 46, and then the removable, spring-loaded fasteners 42 can be attached to the bungee cord. In order to fasten the upper portion of the seat cover 12 to the upper portion of the vehicle seat, the three straps 30, 32 and 44 will be fastened together tautly by the bungee cord 40 and the fasteners 42. The bungee cord 40 has some play in it which tensions the cover to the seat. To attach the bottom portion to a vehicle seat, straps 34, 36 and 46 are tied together, using the bungee cord 40 and the fasteners 42.

Referring now to FIG. 2, the present invention is shown with a full length foam cell sheet that forms part of the invention and is mounted or placed behind the seat cover 12 so that it contacts the actual surface of both the upper portion of the seat and the lower seat of the vehicle. FIG. 6 also shows the positioning of the foam cell sheet 14 relative to a standard bucket seat 50 used in conventional automobiles. The purpose of the sheet is to prevent excessive movement between the terrycloth seat cover surfaces and leather or other type of vehicle seat surfaces. The foam cell sheet acts to provide vertical and lateral resistance, especially when entering or leaving the vehicle, to prevent unnecessary and unwanted movement of the seat cover itself 12. FIG. 2 also shows how the straps 30 are attached along the seam border of the upper and lower portions of the seat cover. The specific location of each of the straps 30 and 34 is as desired to provide the best attachment of the seat cover to the seat. Strap 28 which extends across the entire seat cover laterally also extends out from the side.

FIGS. 3A and 3B show a cross section of the seat cover itself that includes the foam 20, seams 26, the terrycloth cover 18 on one side and 18a on the opposite side. Terrycloth covers 18 and 18a are sewn together along seam 26 so that the entire seat cover has separated areas longitudinally and adjacently disposed containing the conventional foam rubber padding wherein each of the panels provides greater stability, firmness and uplift. Without the individual panels formed by the seams 26, a foam pad would move and slide within the confines of the terrycloth covers 18 and 18a. Also shown are the rods 22 which extend in terrycloth channels formed by the union of the terrycloth panel 18 and the opposite side terrycloth panel 18a which are sewn together along the seam. The perimeter, forming the terrycloth seam, is shown as 16b. In the embodiment shown in FIG. 1, the shape of the upper and lower section is essentially a rectangle with four large elongated sides and four relatively short curved segments along the corner portions. The shape permits a better fit for different sized vehicles and the V-shaped segments formed at the mid-portion where the upper and lower portions are joined together, provide extra space for seat belts to be received without obstruction from the seat cover itself.

FIG. 4 shows a typical elastic-type bungee cord 40 with two conventional removable spring-loaded fasteners 42, one attached at each end for the sake of an example. FIG. 4A again shows the removable fastener 42 attached to the bungee cord 40. Other types of cord may be utilized for tying the straps together that hold the seat down.

FIG. 5 shows the invention disposed on a typical car seat 52 with the foam cell sheet 14 disposed beneath the upper and lower portions of the seat cover 12, all of which are securely strapped by straps 30, 32 and 44 to the upper portion of the seat 52, and by straps 34, 36 and 46 to the lower portion of the seat 52.

FIG. 7 shows a typical Delrin (trademark of Dupont) plastic rod used for stability and shaping to retain the form. The rods are also heat resistant so heat will not be a factor in the car seat.

The use of the bungee cord allows for stretching to fit various size vehicles and at the same time to keep the seats taut and to hold them in place regardless of weight shifts.

Inasmuch as the fastening straps are mounted along midsections of the terrycloth sheets that cover both sides of the seat cover, the device as shown is completely reversible. Also, with the use of the terrycloth cotton material and the 5% dacron, which is shrinkproof, the entire unit may be conveniently washed in a washing machine for cleaning purposes.

The present invention is shown as a seat cover that can be used for almost any type of vehicle that requires seating, and is especially useful for automobiles and trucks to provide increased driver comfort and to reduce excessive temperatures or heat which may be retained by the seats due to solar radiation penetrating vehicle windows. The edges are finished with terrycloth seams and borders for comfort.

The device could also be used as discussed above for wheelchairs, boats, aircraft, or other type of vehicles having seats.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A reversible approved seat pad for a vehicle seat, typically for automobiles or trucks, for use by an operator or passenger, comprising:

a first substantially rectangular machine washable fabric sheet having rounded corners for preventing engagement with foreign objects, said first fabric sheet having an upper edge, a lower edge, and two side edges, said first fabric sheet having a perimeter;

a second substantially rectangular machine washable fabric sheet having rounded corners for preventing engagement with foreign objects, said second fabric sheet having an upper edge, a lower edge, and two side edges, said second fabric sheet having a perimeter;

a foam layer disposed between said first and second fabric sheets, said first and second fabric sheets sewn together about their respective perimeters a predetermined distance from the edges of their respective perimeters;

a plurality of longitudinal threaded seams dividing and connecting said first and second sheets together to form a plurality of separate foam-filled longitudinal chambers;

a plurality of straps sewn about the respective perimeters of said first fabric sheet and said second fabric sheet, at least one strap being connected proximate the upper edge of said first and second fabric sheets, respectively, and at least one other strap being connected to each of the two sides of said first and second fabric sheets, respectively, each of said straps having at least one grommet; and an attachment cord connected between said at least one strap and said at least one other strap through said at least one grommet, thereby providing a three point equilateral force to fixedly attach said pad to said vehicle seat.

2. An improved seat pad as in claim 1, including:
a foam cell sheet sized approximately the size of said first and second fabric sheets, said foam cell sheet disposed between said vehicle seat and said seat pad to prevent lateral or vertical movement of said seat cover when fastened to said seat.

3. An improved seat pad as in claim 1, including:
a third fabric sheet;
a fourth fabric Sheet;
a second foam layer connected and disposed between said third and fourth fabric sheets, said third and fourth fabric sheets having a peripheral fabric border surrounding said third and fourth sheets, including longitudinal threaded seams connecting said third and fourth sheets together, forming a plurality of foam panels disposed longitudinally within said third and fourth sheets, said first and second sheets forming an upper seat pad for an upper portion of a seat, said third and fourth fabric sheets forming a lower seat pad, said upper seat pad and said lower seat pad joined along one lateral edge, integrally formed and connected together, thus providing an entire seat pad having upper and lower portions connected together.

4. An improved seat pad as in claim 3, wherein said plurality of straps include:
an elongated fastening strap fastened along said one lateral edge where said upper and lower seat pads are joined for attaching the seat pad to the vehicle seat.

5. An improved seat pad as in claim 3, including:
at least one flexible rod disposed along one lateral side to retain the shape of said upper seat pad and said lower seat pad portion.

6. An improved seat pad as in claim 5, including:
said upper and lower seat pads having angularly shaped segments with their lateral edges defining a space for seat belts to be received to allow seat belt access when said seat pad is in position.

7. An improved seat cover as in claim 1, including:
said fabric being terrycloth.

8. A reversible seat pad for bucket-type seats used to enhance user comfort comprising:
a first, a second, a third, and a fourth substantially rectangular washable fabric sheet, each of said sheets having a perimeter;
a first foam layer disposed between said first and second sheets and a second foam layer disposed between said third and fourth sheets, wherein said first and second and said third and fourth sheets are attached substantially around their perimeters thereby forming a first pad and a second pad respectively, said first and second pads attached together along a respective attached side;
a plurality of longitudinal seams formed within said first and second foam layers for dividing said first and second pads into a plurality of separate longitudinal chambers, and wherein each of said first and second pads further include;
a first strap including a first grommet, said first strap positioned a predetermined distance from an edge of each of said first and second pads opposite the respective attached side of each of said pads;
a second strap including a second grommet and a third strap including a third grommet, said second and third straps positioned at opposite sides of each of said first pad and said second pad;
a first attachment cord attached between the first, second and third straps of said first pad through said first, second, and third grommets for providing a three point equilateral biasing force across the back of said seat; and
a second attachment cord attached between the first, second and third straps of said second pad through said first, second, and third grommets for providing a three point equilateral biasing force across the underside of said seat.

9. The reversible seat pad according to claim 8 wherein said fabric sheets are made of an 80% cotton and 5% dacron material.

10. The reversible seat pad according to claim 9 wherein said first and second pads have rounded corners for preventing engagement with foreign objects.

11. The reversible seat pad according to claim 9 wherein said second pad includes at least two angularly shaped segments for preventing a vehicle seat belt from contacting said pad thereby allowing ready access to said belt without seat pad movement.

12. The reversible seat pad according to claim 9 further including: an easily removable foam cell sheet having a high coefficient of friction and apportioned substantially the size of said first and second pads and disposed between said vehicle seat and said first and second pads for preventing lateral or vertical movement when said pads are in use.

13. The reversible seat pad according to claim 9 wherein said first and second attachment cord are flexible shock cord.

14. The reversible seat pad according to claim 9 wherein said first and second pads each include at least one flexible rod disposed along side edges of said pads for maintaining a rigid shape.

* * * * *